US008020757B2

(12) United States Patent
Gardner

(10) Patent No.: US 8,020,757 B2
(45) Date of Patent: Sep. 20, 2011

(54) MULTIPLE FINANCIAL INSTITUTION AUTOMATED TELLER MACHINE APPARATUS, SYSTEM AND METHOD FOR USING SAME

(75) Inventor: Daniel C. Gardner, Villanova, PA (US)

(73) Assignee: Select-A-Branch ATM Network, LLC, King of Prussia, PA (US)

( * ) Notice: Subject to any disclaimer, the term of this patent is extended or adjusted under 35 U.S.C. 154(b) by 673 days.

(21) Appl. No.: 12/067,263

(22) PCT Filed: Sep. 20, 2006

(86) PCT No.: PCT/US2006/037032
§ 371 (c)(1),
(2), (4) Date: Sep. 16, 2008

(87) PCT Pub. No.: WO2007/035915
PCT Pub. Date: Mar. 29, 2007

(65) Prior Publication Data
US 2009/0032579 A1 Feb. 5, 2009

Related U.S. Application Data

(60) Provisional application No. 60/718,932, filed on Sep. 20, 2005.

(51) Int. Cl.
*G06Q 40/00* (2006.01)
*G07D 11/00* (2006.01)
*G07F 19/00* (2006.01)

(52) U.S. Cl. ............ 235/379; 235/383; 705/39; 705/40; 705/41; 705/42; 705/43; 705/44; 705/45

(58) Field of Classification Search .................. 235/375, 235/379, 380, 383; 705/39–45
See application file for complete search history.

(56) References Cited

U.S. PATENT DOCUMENTS

| 4,636,947 | A | * | 1/1987 | Ward ............................ 718/101 |
| 6,334,117 | B1 | * | 12/2001 | Covert et al. .................... 705/43 |
| 6,420,091 | B1 | * | 7/2002 | Nakayama et al. ........... 430/302 |
| 6,539,361 | B1 | | 3/2003 | Richards et al. |
| 2003/0078866 | A1 | * | 4/2003 | Richards et al. ................ 705/35 |
| 2005/0119974 | A1 | * | 6/2005 | Drummond et al. ............ 705/43 |
| 2005/0121513 | A1 | * | 6/2005 | Drummond et al. .......... 235/381 |

FOREIGN PATENT DOCUMENTS
JP 2002-352302 12/2002
* cited by examiner

*Primary Examiner* — Thien M. Le
*Assistant Examiner* — Tuyen K Vo
(74) *Attorney, Agent, or Firm* — Goodwin Procter LLP

(57) ABSTRACT

An apparatus, system and method for providing to a network of ATMs (10) the ability to transact business in connection with several financial institutions (30, 40) using each financial institution's display interfaces (34, 44), and optionally provides for advertising and promotional materials (32, 42)) associated with each financial institution targeted to a specific user. The ATM platform is capable of delivering the same look, feel and functionality of each participating financial institutions through a single ATM, which allows for a financial institution to increase brand recognition, maintain customer loyalty and prevent market share loss.

18 Claims, 4 Drawing Sheets

MULTIPLE FINANCIAL INSTITUTION AUTOMATED TELLER MACHINE APPARATUS, SYSTEM AND METHOD FOR USING SAME

CROSS-REFERENCE FOR RELATED PATENT APPLICATION

The present application claims the benefit of U.S. Provisional Patent Application No. 60/718,932 filed on Sep. 20, 2005, the entirety of which is hereby incorporated by reference.

FIELD OF INVENTION

The present invention relates generally to automated teller machines ("ATMs"), and specifically to ATM systems and methods for using same that facilitate the ability to transact business with a plurality of financial institutions using each financial institution's display interfaces, as well as to facilitate the ability for branding by each financial institution.

BACKGROUND OF THE INVENTION

Automated teller machines or ATMs are well-known and are used by customers for ease of convenience to carry out banking and other financial functions. ATMs are normally available for access at any time and may perform functions similar to that of typical banking teller windows. These functions may include cash withdrawals, depositing money, account transfers, balance inquiries, general banking functions and the like. If an ATM is associated with a particular bank or financial institution, the ATM may perform that financial institution's protocol such as display that financial institution's interface or otherwise perform transactions associated with that financial institution. ATMs can be located in a variety of locations beyond the premises of brick-and-mortar locations of financial institution or banks. Examples of such locations include convenience stores, grocery stores, malls and the like.

Generally, ATMs are data terminals with one or more input and output devices. ATMs typically communicate through and are operably connected to a host processor. The host processor is a gateway through which all the various ATM networks become available to the user of the ATM, which in most instances is a cardholder. Most host processors can support either leased-line, dial-up machines or the like. For example, leased-line machines connect directly to the host processor through dedicated telephone line. Dial-up ATMs connect to the host processor through a normal phone line using a modem and a toll-free number, or through an Internet service provider using a local access number dialed by modem. Leased-line ATMs are preferred for very high-volume locations because of their thru-put capability, and dial-up ATMs are preferred for retail merchant locations where cost is a greater factor than thru-put. The host processor may be owned by a bank or financial institution, or it may be owned by an independent service provider. Bank-owned processors normally support only bank-owned machines, whereas the independent processors can support merchant-owned machines.

The convenience of use and the offering of a wide variety of banking and financial functions are crucial in building up the brand image and goodwill associated with a particular banking or financial institution. For example, when a user accesses an ATM associated with his/her financial institution, the user is exposed to the window screen or display screen/interfaces specific to the user's financial institution. Such interfaces can incorporate trademarks, branding or advertisement associated with the financial institution.

However, typically, an ATM is associated with only one financial institution. Thus, a user of a particular ATM is exposed to the financial intuition associated with the particular ATM, regardless of whether the user is a customer of the financial institution. In other words, a user accessing a typical ATM with a card or user device would process a transaction through one financial institution's display screens and/or interface, which include features specific to that financial institution. When the ATM associated with a financial institution that is not the financial institution with which the user is affiliated, the user is exposed to the branding of that financial institution, e.g., displays, trademarks, etc. associated with the financial institution. For example, when a Bank 1 customer uses an ATM affiliated with Bank 2, the display screens and interfaces to which a user is exposed are those associated with Bank 2.

Moreover, in such an event, the user is normally charged a fee because the user is not affiliated with the ATM's associated financial institution, i.e., a "foreign fee" or an "off-us fees." Referring to FIG. 1, banks and financial institutions had begun to charge "foreign fees" or "off-us fees" in hopes of preventing a loss in market share, particularly losing customers to other banks to which a user may be constantly exposed. Previously, banks and financial institutions had absorbed the costs associated with customers using non-affiliated ATMs (i.e., interchange and switching fees). In addition, aside from a bank or financial institution charging a "foreign fee" or an "off-us fee" for a customer using an non-affiliated ATM, the customer is also assessed a surcharge by the non-affiliated owner (e.g., non-affiliated bank) of the ATM. The surcharge is generally given to the bank, financial institution or other entity that owns the ATM.

For example, a Bank 1 customer who continually uses an ATM affiliated with Bank 2, perhaps because of convenience of location, may over time grow accustom to Bank 2 and/or prefer the services, displays, features or interfaces associated with Bank 2. Eventually, the Bank 1 customer in this example switches from Bank 1 to Bank 2 because of such reasons or because the user dislikes paying the "foreign fee" every time he or she uses the Bank 2-affiliated ATM. Since over the course of the past several decades, a substantially increasing amount of users were transacting business through ATMs (many of whom use ATMs as their primary source of contact with a bank), banks and financial institutions tout that customers using "bank affiliated" ATMs will not be charged with a fee. However, although many customers will seek out ATMs that have a minimal or zero transaction costs, many customers will continue to use non-bank-affiliated ATM and pay the "foreign fees" for a variety of reasons such as convenience of location, effort to find, and other personal reasons.

Accordingly, there is a present need to overcome the aforementioned problems and allow users access to such user's financial institution display systems regardless of the ATM being used.

SUMMARY OF INVENTION

The present invention provides an ATM that is capable of being branded by multiple financial institutions.

The present invention also provides for multiple financial institutions to attain the capability to increase brand recognition, maintain customer loyalty and prevent market share loss through an ATM capable of delivering the same look, feel and functionality of each of the multiple financial institutions.

The present invention is also capable of delivering promotional materials associated with a financial institution through the single ATM.

In one aspect the present invention is an automated teller machine having means for identifying a user device, means for identifying a financial institution associated with the user device, a database storing at least a first financial institution's protocol for facilitating a banking transaction and a second financial institution's protocol for facilitating a banking transaction, and a controller operably coupled to the database, the user device identifying means, and the financial institution identifying means, the controller programmed to (1) upon determining that the user device is associated with the first financial institution, retrieve from the database and execute the first financial institution's protocol, or (2) upon determining that the user device is associated with the second financial institution, retrieve from the database and execute the second financial institution's protocol.

In one embodiment, the automated teller machine includes a display module connected to the controller. In another embodiment, the first and second financial institution's protocol have display interfaces for facilitating the execution of a banking transaction. In yet another embodiment, the first and second financial institution's protocol has promotional components associated with either the first financial institution and the second financial institution.

In a further embodiment, upon determining that the user device is not associated with a financial institution whose protocol is not stored in the database, the controller is further programmed to retrieve and execute from the database a default protocol for facilitating a banking transaction. The default protocol can be the first financial institution's protocol, the second financial institution's protocol.

In another aspect, the present invention is an automated teller machine having means for identifying a user device, means for identifying a financial institution associated with the user device, a database storing a plurality of financial institutions' protocols for facilitating banking transactions and a controller operably coupled to the database, the user device identifying means, and the financial institution identifying means, wherein upon determining that the user device is associated with a financial institution whose protocol is stored on the database, the controller is programmed to retrieve from the database and execute that financial institution's protocol.

In yet another aspect, the present invention is a method of transacting with a financial institution having the steps of storing on a database a first financial institution's protocol, storing on a database a second financial institution's protocol, identifying a user device associated with an account, identifying a financial institution associated with the user device, and upon determining that the user device is associated with the first financial institution, retrieving from the database and executing the first financial institution's protocol; or, upon determining that the user device is associated with the second financial institution, retrieving from the database and executing the second financial institution's protocol.

In a further aspect, the present invention is a method of performing an automated banking transaction having the steps of (1) providing an automated teller machine comprising means for identifying a user device, means for identifying a financial institution associated with the user device, a database storing a plurality of financial institutions' protocols for facilitating banking transactions, and a controller operably coupled to the database, the user device identifying means, and the financial institution identifying means, identifying a user device associated with an account, (2) identifying a financial institution associated with the user device, and (3) upon determining that the user device is associated with a financial institution whose protocol is stored on the database, retrieving from the database and executing that financial institution's protocol.

In yet another aspect, the present invention is a method of transacting business having the steps of (1) providing an automated teller machine comprising a database having a plurality of financial institutions' protocols for facilitating a banking transaction stored thereon, (2) identifying a user device associated with an account, (3) identifying a financial institution associated with the user device, (4) upon determining that the financial institution associated with the user device has a protocol stored in the database, retrieving and executing the protocol of the identified financial institution, (5) executing a banking transaction in response to a user's commands with the identified financial institution, and (6) charging a fee to the identified financial institution. In one embodiment, the user is not charged a fee when it is determined that the user device is associated a financial institution having a protocol stored in the database.

In another aspect, the present invention is a system for providing automated teller machine services having an automated teller machine and an automated teller machine server operably connected to the automated teller machine, the automated teller machine server at a location external from the automated teller machine and comprising a plurality of participating financial institutions' protocol, each participating financial institution's protocol comprising participating financial institution display interfaces and participating financial institution promotional components.

DETAILED DESCRIPTION OF THE INVENTION

The apparatus, system and method of the present invention generally relates to an automated teller machine or ATM that is capable of being branded by multiple financial institutions. This allows for a financial institution or the like to increase its brand recognition, maintain customer loyalty and prevent market share loss. The present invention can comprise an ATM platform that is capable of delivering the same look, feel and functionality of each of a multitude of different participating financial institutions through a single ATM. In one embodiment, the ATM of the present invention is also capable of delivering promotional components associated with a financial institution through the single ATM. A financial institution generally includes but is not limited to savings and loans, banks, credit unions, hedge funds, brokerage houses, public and private investment services firms, and any other entity that is capable of providing financial services to customers.

Generally, as ATMs continue to be more frequented and become a more trusted self-service delivery channel, it is highly desirable for financial institutions to seek to fully leverage a user's "ATM visit" in order to strengthen the customer relationship, in addition to cross selling the financial institution's other products and services. For example, the financial institution may have a promotional campaign in affiliation with an insurance company or an automobile manufacturer that may provide discounts to such financial institution's members. In addition, and as stated above, ATMs are useful tools in creating brand awareness and brand loyalty to both customers and non-customers of a financial institution. The present invention allows financial institutions to extend their brand name and recognition to points of presence incorporating the ATM apparatus of the present invention. These participating financial institutions will not only be capable of marketing to and servicing their customers at increased locations (i.e., various locations incorporating of the present invention), but also be capable at varying degrees to prevent other financial institutions from interactively seizing their customers through such institutions' ATM operating environments.

Figure 1:
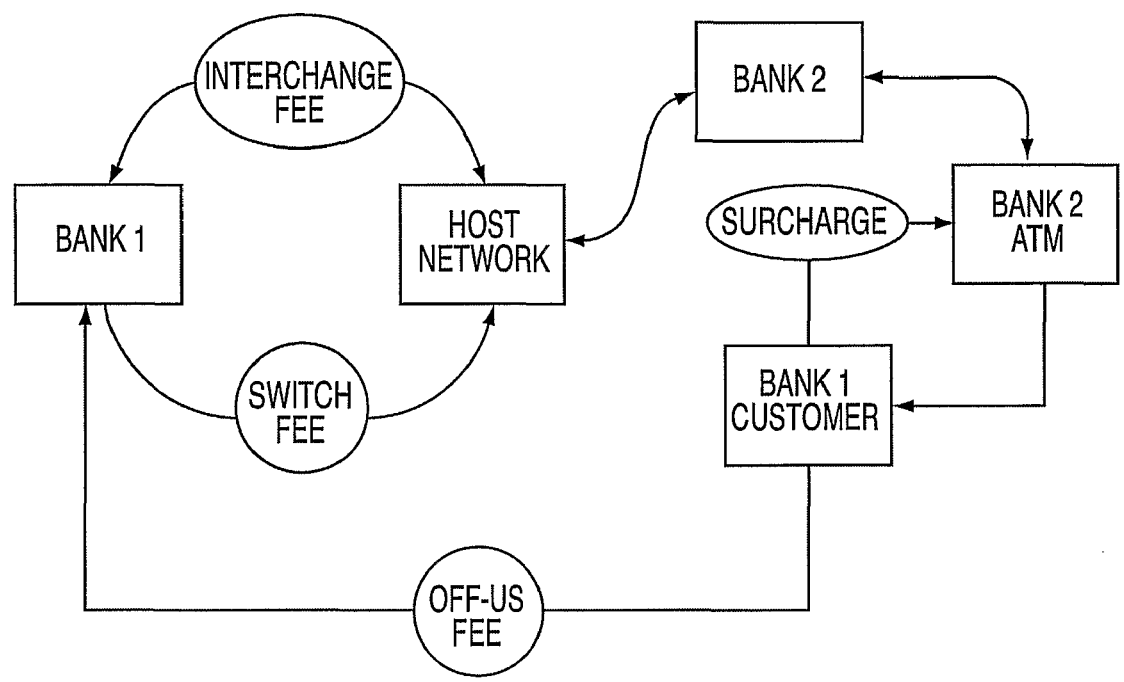
FIG. 1 is a diagram showing the prior art use of an ATM by a customer not affiliated with the owner of the ATM.
Figure 2:
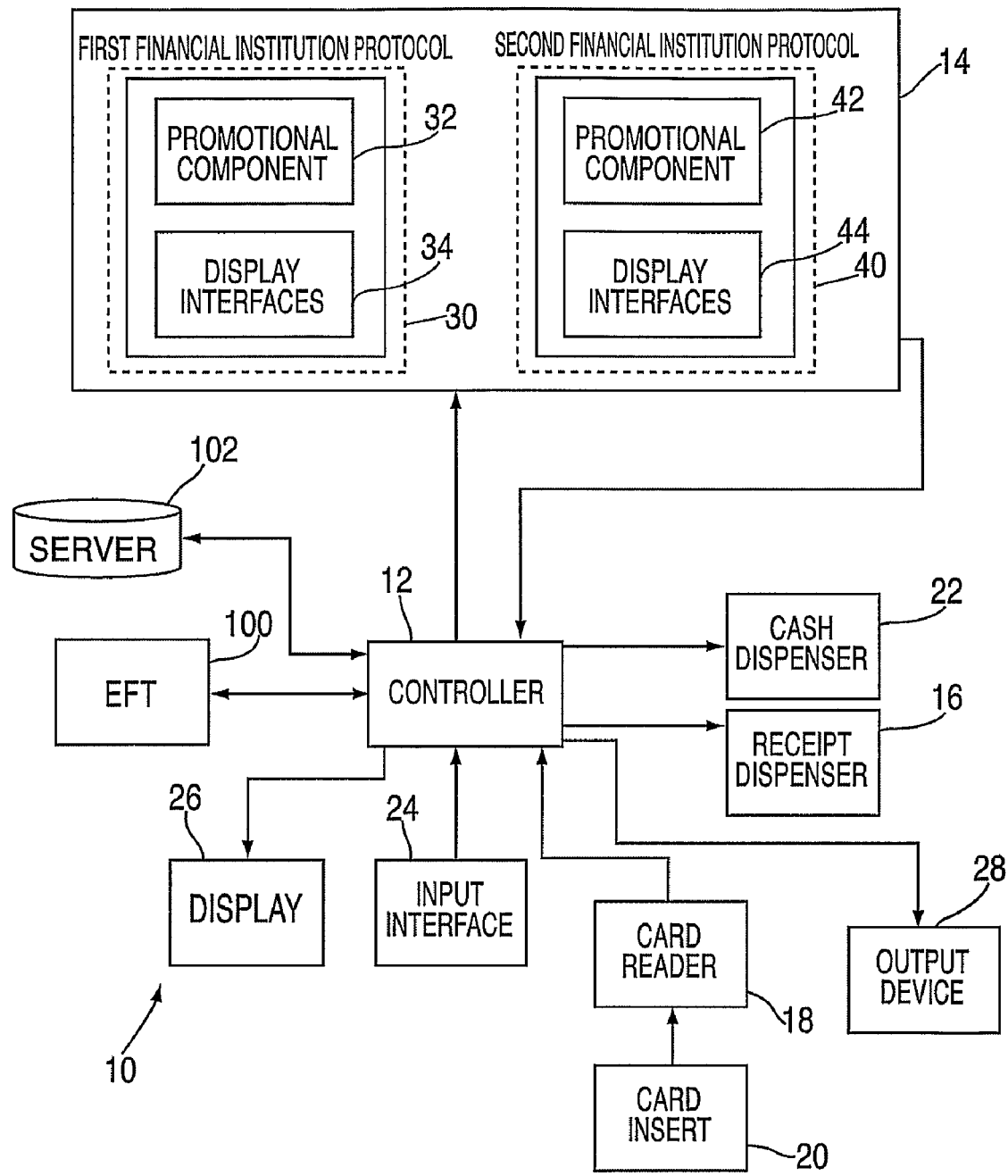
FIG. 2 is a block diagram of one embodiment of the ATM apparatus of the present invention.

Referring to FIG. 2, a preferred embodiment of the ATM apparatus 10 of the present invention is shown. The ATM of the present invention can comprise a display 26 or display module, an input interface 24, a card insert 20, which is typically used to receive a card including but not limited to a card slot or a card swipe, a card reader 18, a cash dispenser 22, which is capable of dispending cash, currency or bank notes, and a receipt dispenser 16. The display 26 can be a audio-visual user interface, graphical interface, monitor or the like. The input interface 24 includes but is not limited to a keypad device, touch screen or any other device that allows for the user of the ATM to input data and transaction commands to be processed by the ATM. The touch screen, however, would serve as both an input interface that it allows for the communication of information from the user as well as an output device that allows from communication of information to the user. The card reader 18 is generally a device having or in communication with executable software capable of recognizing an account associated with the user device or card.

The ATM apparatus 10 can also comprise one or more programs that are executable including but not limited to device interaction software that allows for the communication between the input and output devices and the controller 12 and transactional log software that provides a list of how many participating and non-participating financial institution users have accessed the ATM. Such software can also include software for the regular operation and maintenance of the ATM apparatus, device recognition, device execution as well as software known to persons skilled in the art to be generally associated with the function and operation of ATMs.

While reference is made to the above-referenced input and output devices, it is understood that a variety of other input and output devices can be incorporated into the ATM of the present invention in order to assist or facilitate a user's experience in transaction with an ATM. For example, the ATM can also comprise a receiving slot (not shown) for the acceptance of deposits. Such deposits can be credited to the account of the user at the user's associated financial institution. In addition, the ATM can comprise other output device 28. Output device 28 includes but is not limited to conventional ATM associated-devices such as speakers and the like, as well as non-conventional ATM associated devices such as promotional content dispensers and promotional component interfaces, which will be described in greater detail below. The output device 28 can also comprise one or more ticketing distribution devices capable of dispensing tickets, vouchers and the like for use in association with venues such as ski resorts, theme parks, historic attractions, tourist destinations and similar venues.

The ATM apparatus 10 of the present invention also comprises a controller 12 and database 14. The controller 12 can be comprised of sub-controllers that have more specific functions, including those relating to execution of banking and financial transactions and communication with server 102 or outside data lines or networks. The controller 12 is operatively connected to display 26, input interface 24, card insert 20, cash dispenser 22, and receipt dispenser 16, as well as any other devices incorporated into the ATM, or any of a combination thereof. The controller 12 is in operative connection to and can access database 14 and/or executable programs that facilitate the operation of the ATM. The controller 12 can be connected to a memory storage source (not shown) such as RAM (Random Access Memory). The controller 12 can communicate with the database 14 to retrieve data or files in a any of a number of formats including but not limited to MPEG (Motion Pictures Experts Group), JPEG (Joint Photographic Experts Group), GIF (Graphics Interchange Format) and the like.

The database 14 is comprised of hardware such as a hard disk drive, CD ROM or other suitable storage media which allow for storage of audio content, video content graphic content or other content that is to be displayed through the display 26 or presented to another output device 28 during a user transaction. The database can be comprised of multiple financial institutions' protocol, which generally govern data interchange, including but not limited to video data, graphic data, audio data, display interfaces associated with a specific financial institution, transactional data associated with a user or financial institution such as account information, a user PIN number, executable software, as well as branding content, advertisements and promotional content associated with or sponsored by a financial institution. Branding content, advertisements promotional content and the like are classified as promotional component 32, 42 of the first financial institution and second financial institution, respectively, and generally to the promotional component of any participating financial institution, i.e., a financial institution that is affiliated with the system of the present invention.

In one embodiment, the database 14 is comprised of a first financial institution protocol 30 and a second financial institution protocol 40. The first financial institution protocol 30 and a second financial institution protocol 40 can include but is not limited to graphic components, video components, audio components, transactional components, display interfaces associated with the first financial institution or the second institution, transactional data associated with a user or financial institution such as account information, a user PIN number, executable software, as well as branding content, advertisements and promotional content associated with or sponsored by the first financial institution or second financial institution and the like. Specifically, the first financial institution protocol 30 is generally comprised of display interfaces 34 and promotional content 32. Similarly, the second financial institution protocol 40 is generally comprised of display interfaces 44 and promotional content 42.

While reference is made to the first and second financial institution protocol 30, 40, such reference is illustrative and it is understood that the database can be comprised of more than two financial institution protocol. The database 14 is adapted to comprise or house any or a number of financial institutions that are incorporated into or subscribe to the system of the present invention (i.e., participating financial institutions). As such, the participating financial institution protocols included in the database 14 can comprise, for example, 10, 20, 100 or even 1000 financial institutions. The system and method of the present invention contemplates signing up financial institutions on a nationwide basis to participate in its network.

The display interfaces 34, 44 comprise the graphic, text and video content that a user would see if transacting on an ATM of the first financial institution and the second financial institution, respectively. For example, with respect to the display interfaces 34 of the first financial institution, the display "welcome screen" will be similar to, substantially similar to or analogous to that of an ATM owned or operated by the first financial institution. The ATM transactions would include, among others, cash withdrawal, cash deposit, account balances and the like incorporated within the display interfaces of the first financial institution (or analogous display interfaces). Included in such display interfaces could be optional video content, audio content and other content typically seen by user of an ATM owned by or operated by the first financial institution.

Promotional component 32 can comprise video, audio, graphic, textual content or the like, in any format. Promotional component 32 can also be displayed on the display 26 or presented or displayed on one or more output devices, which would include but not be limited to advertisements, branding and promotions incorporated in the display 26. In one embodiment, the ATM 10 of the present invention incorporates a secondary display or kiosk-type screen, which will present video, graphical and audio content, approved advertising or messaging, or a combination thereof. Such approved advertising and messaging may be related to the first financial institution or a third-party approved by the first financial institution, or the second financial institution or a third party approved by the second financial institution. The secondary display or kiosk-type screen may be placed in a variety of locations including, but not limited to, over, to the side of, below or in close proximity to the display screen or display module. Further, the secondary display or kiosk-type screen may be of the same size, smaller or larger than display 26 as desired or as practical in light of the size and space limitations of an ATM 10 of the present invention. Multiple secondary displays or kiosk-type screens may also be incorporated.

Figure 3:
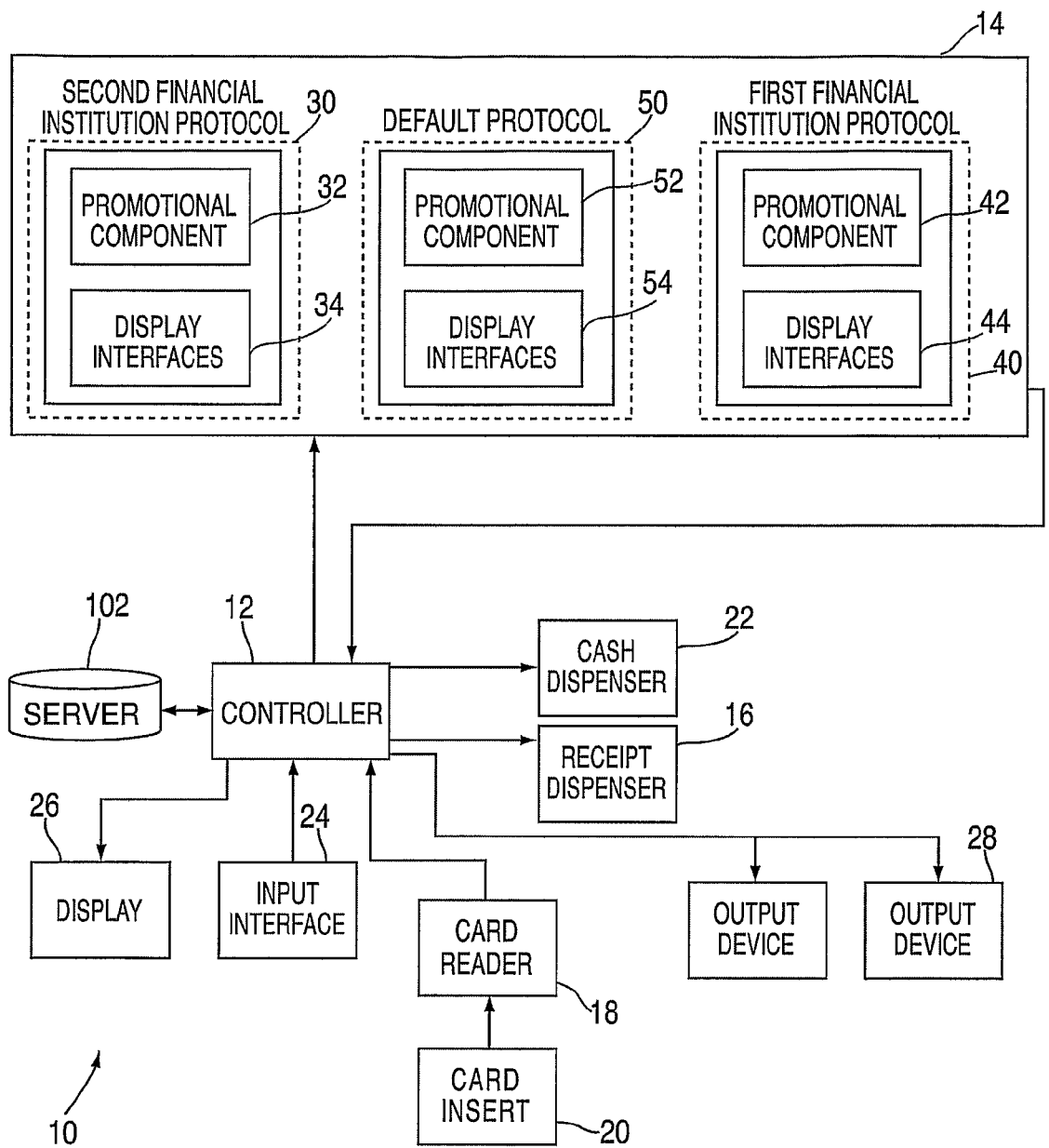
FIG. 3 is a block diagram of another embodiment of the ATM apparatus of the present invention.

Referring to FIG. 3, in another embodiment of the present invention, the database 14 includes a default protocol 50 which is in communication with the controller 12. The default protocol 50 can include but is not limited to graphic components, video components, audio components, transactional components, display interfaces associated with a generic ATM transaction, the first financial institution, the second institution, or a participating financial institution, transactional data associated with a user or financial institution such as account information, a user PIN number, executable software, as well as branding content, advertisements and promotional content associated with or sponsored by the first financial institution, second financial institution, a participating financial institution, a third party and the like. The default protocol 50 generally comprises a promotional component 52 and display interfaces 54 associated with the default protocol 50.

The default display interfaces 54 comprise generic graphic, video and audio content, for example, that a user would see if transacting on an ATM not affiliated with a financial institution. In one embodiment, the default display interfaces 54 can include multiple basic input prompt screens (including but not limited to a "welcome screen," a "please insert card" screen, a "please choose your transaction" screen, among others) without reference to a financial institution. Default ATM transactions would include those generally associated with typical ATMs including but not limited to, among others, cash withdrawal, cash deposit, and account balances. Default promotional component 52 can comprise video, audio, graphic, textual content or the like, in any format, associated with a featured sponsor.

In another embodiment, the default display interfaces 54 are those associated with a participating financial institution. Included in such display interfaces could be optional video content, audio content and other content typically seen by user of an ATM owned by or operated by the participating financial institution.

The controller 12 of the ATM 10 of the present invention is in communication with a server 102, other networks and or data links. The ATM can be part of a network of ATM connected to an electronic funds transfer ("EFT") network as generally known to persons skilled in the art. The EFT network 100 can be operated by an ATM services provider such as RBS Lynk, CIRRUS and PLUS networks. In one embodiment, the EFT network 100 is in communication with the controller 12, which in turn is in communication with server 12. Communications between server 102 and controller 12 are established for transmitting and receiving data relating to participating financial institutions. Communication can be completed over a communication network including but not limited to telephone lines, cable lines, broadband links, the Internet, TCP/IP, and satellite broadcast and the like.

The server 102 can be an entirely separate system or network that is physically separate from the controller 12 and ATM apparatus of the present invention. The controller 12 is capable of facilitating the communication and downloading of data and files to the database 14. The data is preferably a financial institutions' protocol, other data or files associated therewith. The controller 12 can also facilitate the removal of data from the database 14 as initiated by a command from the server 102. Participating financial institutions who wish to update, revise, reload or initiate their protocol and/or promotional component can do so on the server 102, which then communicates the data to the ATM and, specifically, the controller 12 which stores it in the database 14. In a preferred embodiment, a participating financial institution will integrate its display interfaces with promotional content to create a look and feel of the financial institution's own ATMs, yet at the same time incorporating branding, advertisements, etc. It should be noted that the server 102 may be an entirely separate system from the ATM 10.

In another embodiment, the participating financial institutions who wish to update, revise, reload or initiate their protocol and/or promotional component can do so by putting such data/files onto storage media such as CD ROMS, disks, and the like and physically transporting such storage media to the individual ATMs within the present invention's ATM network. Once at individual ATMs, a technician or a knowledgeable person uploads such storage media containing data/files onto the database 14.

Figure 4:
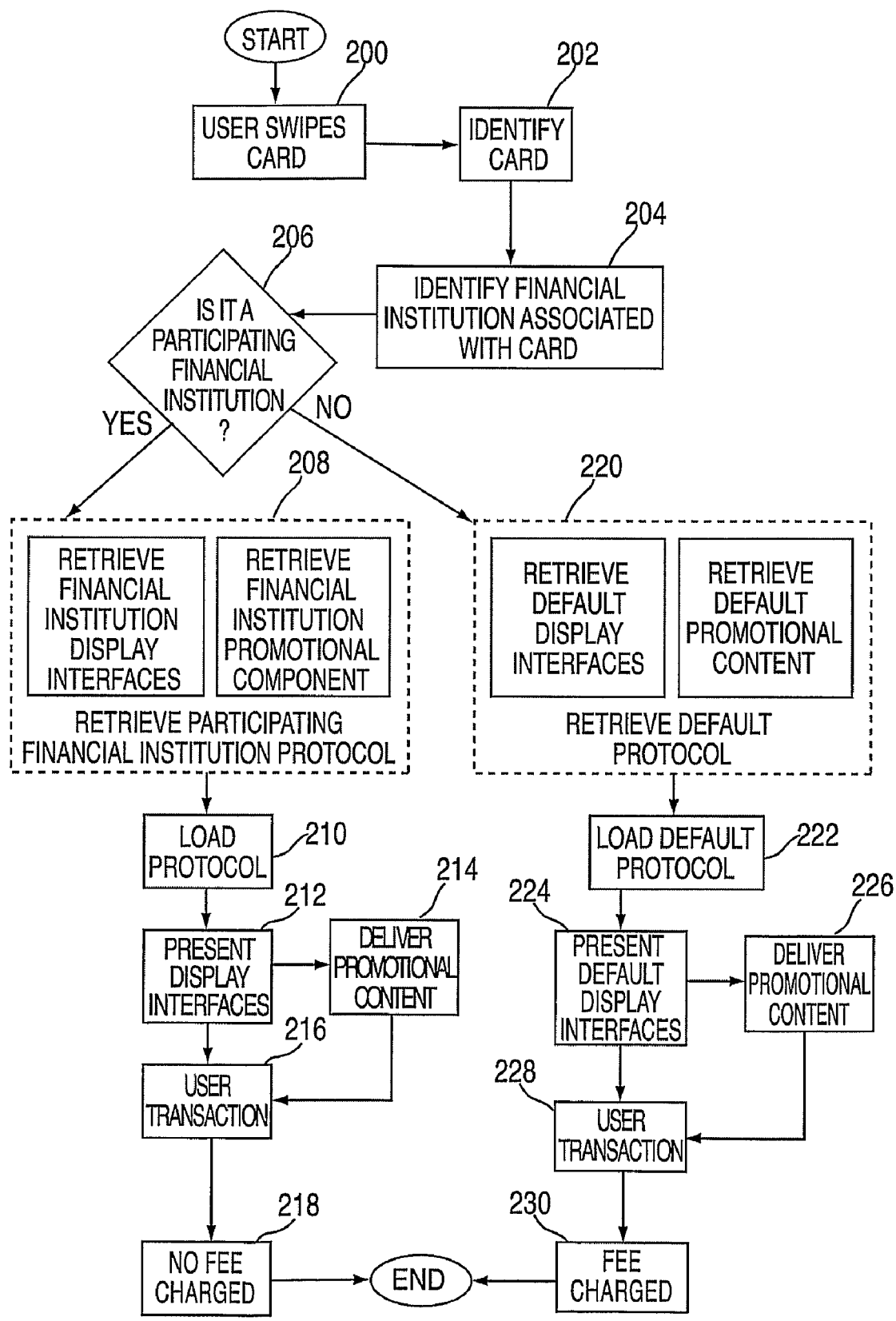
FIG. 4 is a flow chart illustrating operation of the present invention.

Referring to FIG. 4, the process for using the present invention will now be described. The ATM of the present invention presents a default user interface that is directed to a prospective user. In step 200, the default interface or screen informs and directs a user to engage his or her user device or ATM card with the card insert, which generally is a card slot or card swipe. In step 202, after the user inserts the user's card, the controller 12 reads the card information and identifies the account associated with the card. In step 204, the controller correlates the account with a financial institution associated with the account. The controller 12 can store the data in temporary data storage. In step 206, the controller 12 determines whether the financial institution associated with the card is a participating financial institution. If the answer is "yes," the controller 12 proceeds to step 208, accesses the database 14 and retrieves the participating financial institution protocol, which includes but is not limited to the financial institutions' display interfaces and promotional component. The controller then, in step 210, loads the financial institution protocol and, in step 212, presents the display interfaces on the display. Optionally, in step 214 the controller 12 can, concurrently or close to the same time, present the promotional component associated with the participating financial institution. In step 216, the user proceeds with the transaction as if using an ATM owned by the financial institution (i.e., the user experience on the ATM of the present invention has the same look and feel as that on the financial institution's ATM).

At step 216, the user interacts with the ATM wherein the display requests, for example, that the user select the type of transaction desired. This could include balance inquiry, deposit, withdrawal, account transfer and the like. The display screen can also request additional information or authorization from the user such as user's PIN number, the amount the user wishes to deposit (for account deposit situations), and the like. Such information can also be stored in a temporary data storage.

In addition, during the user transaction period, the user is exposed to continued branding of the financial institution, as well as promotional materials including but not limited to advertisements for and information regarding financial institution services and the like. In step 218, as the financial institution is a participating financial institution, in a preferred embodiment, no surcharge fee is charged by the ATM. In an alternative embodiment, a minimal surcharge fee is assessed by the ATM. However, depending on predetermined factors including but not limited to location of the ATM, accessibility of the ATM, volume of ATM users and other business justifications, a participating financial institution may or may not decide to charge a foreign fee to its own customers.

During this time, the ATM can direct the user to input information during a predetermined period of time. The predetermined period of time can vary depending on the type of transaction, the preference of the ATM owner, the network host, the financial institution or other factors. For example, the amount of time given a user for inputting his or her PIN number may be longer compared to prompting the user to enter the amount of money requested to be withdrawn. If a user exceeds the predetermined time for a specific input request, the ATM may terminate the transaction process and return to the default screen or interface. During the period of time, promotional content can also be displayed or presented. Alternatively, the ATM may request additional authorization such as an additional input of the user's PIN number. If the ATM terminates the transaction process, the terminal returns to the default interface or screen.

Referring back to step 206, if the answer is "no," the controller 12 proceeds to step 220, accesses the database 14 and retrieves the default protocol, which could include but is not limited to the default display interfaces and default promotional component. The controller then, in step 222, loads the default protocol and, in step 224, presents the display interfaces on the display. Optionally, in step 226, the controller 12 can, concurrently or close to the same time, present the promotional component associated with the default protocol. In step 228, the user proceeds with the ATM transaction being exposed to the default display interfaces. In on embodiment, the default display interfaces is generic that is not affiliated with a participating financial institution or may be associated with a third-party promoting a product or service. However, it is also noted that the default display interfaces can be that associated with a participating financial institution. In step 230, since the user's account is not affiliated with a participating financial institution, a surcharge fee is assessed by the ATM. Depending on factors including but not limited to business justifications and corporate policies, however, the ATM user's non-participating financial institution likewise may or may not decide to charge a foreign fee to its customer, the ATM user in this instance.

As explained previously, another feature of the present invention is the capability for financial institutions to brand themselves to their existing customers or, potentially, to new customers. The financial institution protocol can govern which promotional component screens are used. The protocol can also direct the number and type of advertisements and marketing messages. This could allow the participating financial institutions to customize their interfaces and promotional content to better reach out to customers with a unique user experience, strengthen customer relations and build up brand loyalty. For example, a financial institution may want prominent placement of its logo, a particular color or background on the display interfaces, specific display interface language and font, and the like.

In one embodiment, the system and method of the present invention comprises three distinct advertisements, which will appear on-screen during each transaction period in which a user utilizes an ATM of the present invention. Such advertisement would at a minimum include 3 screens: a "welcome screen" advertisement, a "thank you" screen advertisement and a "please wait" screen advertisement. However, the scope of the present invention is not limited to such an advertisement scheme and more or less advertisements may be strategically placed on various screens at the discretion of the ATM owner or other authorized party.

It is also within the scope of the present invention that the ATM will be brand-wrapped in generic branding information or other approved branding. Generic branding, for example, can be comprised of the promotional component of a featured participating financial institution, or of a retailer who would pay to have its products and services advertised. In one preferred embodiment, the present invention dispenses branded receipt "print-outs" using an output device 28. Users would receive a branded receipt, reflecting either the owner of the ATM, generic branding (e.g., for customers of non-participating financial institutions), participant financial institution branding or a combination thereof. Such "branding" may include, but is not limited to, watermarkings in the background of the print-out text, branding and other advertisements on the back of the print-out, branding on the front of the print-out in relative proximity to the print-out text, or any other "branding" that may be known in the art.

In another embodiment, each display interface during a user transaction will allow the inclusion of a predetermined number of text ads that will scroll within a "ticker"-type ribbon. In one preferred embodiment, the predetermined number is two; however, any number of text ads may be included. Moreover, the "ticker"-type ribbon may be located at different locations on the display screen such as vertically on the side, horizontally along the bottom or horizontally along the top of the display screen or secondary display.

In yet another embodiment, the ATM of the present includes a play-only video component system, which will reside on the custom topper monitor. This video component system will create a branded "teaser" announcing unique services delivered by the ATM and giving passers-by an additional reason to potentially interact with the ATM. Such branding teaser may be of a predetermined length and include a variety of advertisement content and form generally known in the art.

It is also possible for promotional materials to be displayed occasionally on the display or output devices during the course of the transaction. This can occur particularly where the terminal is in a public location, such as a ticket vendor at a train station or airport. It is also possible for promotional materials to be displayed while the ATM is idle (i.e., not interacting with a user) and waiting for a user to engage the ATM. The promotional materials may interest a passerby if the ATM is in a public location such as a grocery store, mall, airport or other area where there is at least a minimal occurrence of passersby.

The apparatus, system and method of the present invention can also be adopted to include a wide variety of transactions that would make it more convenient to utilize a remote system having input devices, output devices, one or more displays, and a controller in communication with a remote network or server. For example, in one embodiment, a user can remit payment to his or her credit card. In another embodiment, a user can remit payment for the payment of invoices or bills. In another embodiment, a user can pre-pay or remit payment to a electronic toll collection system (such as EZ Pass) for credit into a related account.

While this invention has been described with reference to illustrative embodiments, this description is not intended to be construed in a limiting sense. Various modifications of the illustrative embodiments, as well as other embodiments of the invention, which are apparent to persons skilled in the art to which the inventions pertains are deemed to lie within the spirit and scope of the invention.

What is claimed is:

1. An automated teller machine comprising:
   means for identifying a user device;
   means for identifying a financial institution associated with the user device;
   a database storing locally on the automated teller machine at least a first financial institution's protocol comprising first display interface components for facilitating a banking transaction with the first financial institution and a second financial institution's protocol comprising second display interface components for facilitating a banking transaction with the second financial institution; and
   a controller operably coupled to the database, the user device identifying means, and the financial institution identifying means, the controller programmed to (1) upon determining that the user device is associated with the first financial institution, retrieve the first display interface components from the local database, build a first display screen associated with the first financial institution, and execute the first financial institution's protocol, or (2) upon determining that the user device is associated with the second financial institution, retrieve the second display interface components from the local database, build a second display screen associated with the second financial institution, and execute the second financial institution's protocol.

2. The automated teller machine of claim 1 further comprising a display module operably coupled to the controller.

3. The automated teller machine of claim 1 wherein the first financial institution's protocol comprises a first set of promotional components associated with the first financial institution and wherein the second financial institution's protocol comprises a second set of promotional components associated with the second financial institution.

4. The automated teller machine of claim 1 wherein upon determining that the user device is not associated with a financial institution whose protocol is not stored in the database, the controller is further programmed to retrieve and execute from the database a default protocol for facilitating a banking transaction.

5. The automated teller machine of claim 4 wherein the default protocol is the first financial institution's protocol or the second financial institution's protocol.

6. The automated teller machine of claim 4 wherein the default protocol is a generic protocol not associated with a specific financial institution.

7. The automated teller machine of claim 6 wherein the generic protocol comprises a generic set of display interfaces for facilitating the execution of a banking transaction.

8. The automated teller machine of claim 7 wherein the generic protocol comprises a generic set of promotional components not associated with the first financial institution or the second financial institution.

9. The automated teller machine of claim 1 wherein the user device is associated with an account.

10. An automated teller machine comprising:
    means for identifying a user device;
    means for identifying a financial institution associated with the user device;
    a database storing locally on the automated teller machine a plurality of financial institutions' protocols, each protocol comprising display interface components that when assembled provide display screens for facilitating banking transactions at the respective financial institution; and
    a controller operably coupled to the database, the user device identifying means, and the financial institution identifying means, wherein upon determining that the user device is associated with a financial institution whose protocol is stored on the local database, the controller is programmed to retrieve display interface components from the local database associated with the financial institution, build a display screen associated with the financial institution and execute that financial institution's protocol.

11. A method of transacting with a financial institution comprising the steps of:
    storing on a local database a first financial institution's protocol comprising a first set of display interface components for facilitating banking transactions;
    storing on the local database a second financial institution's protocol comprising a second set of display interface components for facilitating banking transactions;
    identifying a user device associated with an account;
    identifying a financial institution associated with the user device; and
    upon determining that the user device is associated with the first financial institution, retrieving the first display interface components from the local database, building a first display screen associated with the first financial institution, and executing the first financial institution's protocol; or, upon determining that the user device is associated with the second financial institution, retrieving the second display interface components from the local database, building a second display screen associated with the second financial institution, and executing the second financial institution's protocol.

12. The method of claim 11 wherein the first financial institution's protocol comprises a first set of promotional components associated with the first financial institution and wherein the second financial institution's protocol comprises a second set of promotional components associated with the second financial institution.

13. The method of claim 11 further comprising the step of displaying, based on the identification of the financial institution, the first display screen of the first financial institution's protocol or displaying the second display screen of the second financial institution's protocol.

14. A method of performing an automated banking transaction comprising:
providing an automated teller machine comprising means for identifying a user device, means for identifying a financial institution associated with the user device, a local database storing a plurality of financial institutions' protocols, each protocol comprising a set of display interface components for facilitating banking transactions, and a controller operably coupled to the database, the user device identifying means, and the financial institution identifying means;
identifying a user device associated with an account;
identifying a financial institution associated with the user device; and
upon determining that the user device is associated with a financial institution whose protocol is stored on the database, retrieving the display interface components from the database, building a display screen for facilitating banking transactions, and executing the financial institution's protocol.

15. The method of claim 14 wherein a set of promotional components is stored in the database and further comprising, upon determining that the user device is associated with the financial institution whose set of promotional components is stored on the database, retrieving from the database and displaying the set of promotional components.

16. A method of transacting business comprising the steps of:
providing an automated teller machine comprising a local database having a plurality of financial institutions' protocols for facilitating a banking transaction stored thereon, each protocol comprising a set of display interface components associated with a respective financial institution;
identifying a user device associated with an account;
identifying a financial institution associated with the user device;
upon determining that the financial institution associated with the user device has a protocol stored in the database, retrieving and executing the protocol of the identified financial institution and building a display screen for facilitating a banking transaction with the identified financial institution;
executing the banking transaction in response to a user's commands with the identified financial institution; and
charging a fee to the identified financial institution.

17. The method of claim 16 wherein the user is not charged a fee when it is determined that the user device is associated a financial institution having a protocol stored in the database.

18. The method of claim 16 further comprising:
upon determining that the financial institution associated with the user device does not have a protocol stored in the database, retrieving and executing a default protocol for facilitating a banking transaction; and
charging a fee to the user.

* * * * *